Patented Dec. 8, 1953

UNITED STATES PATENT OFFICE 2,662,086

METHOD OF PREPARING HYDROLYTIC CONDENSATION PRODUCT OF DICHLORODIPROPYL SULFIDE IN AQUEOUS HYDROGEN CHLORIDE AND CONDENSATION PRODUCT RESULTING THEREFROM

Everett C. Hughes, Cleveland Heights, and Franklin Veatch, Cleveland, Ohio, assignors to The Standard Oil Company, Cleveland, Ohio, a corporation of Ohio No Drawing. Application April 19, 1948, Serial No. 21,858

11 Claims. (Cl. 260—327)

This invention relates to a process of hydrolyzing dichlorodipropyl sulfide, or reaction mixtures containing dichlorodipropyl sulfide resulting from the reaction of propylene and sulfur monochloride, to form (1) dimethyl thioxane and (2) a hydrolytic condensation product in the form of an oil-like polymer. The invention also relates to such new oil-like polymers which are useful as a plasticizer and as a special lubricant.

Dimethyl thioxane is a colorless liquid having a boiling point of 162° C. It is water insoluble, but is soluble in most common organic solvents. The properties of this compound are known and it is recognized as being a very useful solvent. However, it has not been possible heretofore to produce it economically and in substantial quantities.

One object of the invention, therefore, is to provide an easy and economical method of producing dimethyl thioxane.

The hydrolytic condensation product referred to as the second product is an oil-and-water insoluble, oil-like polymer of about 200–400 SUS viscosity at 100° F. with a low viscosity index. This hydrolytic condensation product is useful as a plasticizer and as a special lubricant. It is believed to be new and the invention provides an easy and economical method of producing it.

In accordance with the present invention, the dimethyl thioxane and the new hydrolytic condensation product are produced simultaneously by hydrolysis of the reaction product of propylene and sulfur monochloride, or by hydrolysis of dichloropropyl sulfide in the presence of a solution of hydrochloric acid as a hydrolytic agent.

The process can be operated either as a batch process or as a continuous process with high yields on each pass through the continuous system.

The product to be hydrolyzed to form dimethyl thioxane and the hydrolytic condensation product may be produced by reacting sulfur monochloride with propylene under pressure and at a relatively low temperature. For example, propylene may be bubbled through sulfur monochloride at a reaction temperature below 50° C., and at a pressure between about 35 and 50 pounds/sq. inch.

The temperature preferably is at about 35° C. Too high a temperature favors side reactions. At a low temperature, for example 0° C., the reaction proceeds but the rate is very slow for the usual convenience. The pressure may vary from atmospheric to the pressure of liquid propylene at the reaction temperature. The higher the pressure, the more rapid is the reaction and the greater need for heat dissipation. It is a matter of convenience.

Propylene is bubbled through the sulfur chloride until the reaction is complete, as indicated by a negative test with starch-iodide solution. Sulfur monochloride reacts with the iodide to liberate iodine which colors the starch blue. When the sulfur monochloride is completely reacted, the addition of starch iodide to a sample will not produce a blue coloration.

The reaction between sulfur monochloride and propylene appears to proceed as follows:

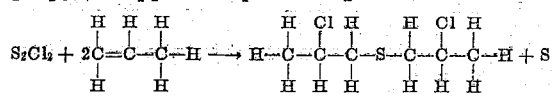

The dichlorodipropyl sulfide is the primary product although some isomers of dichloropropyl sulfide may be formed as well as some disulfide of the formula:

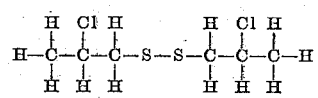

and isomers thereof.

The excess sulfur and other higher boiling point reaction products can be separated by flash distilling the dichloropropyl sulfide or by distilling it with steam in the presence of dilute HCl. However, this distillation is not essential to the process for the reason that the crude reaction products may be used directly and somewhat higher yield of the hydrolytic condensation product is obtained per pass through the process when the crude reaction mixture is used.

Dichlorodipropyl sulfide or the crude reaction product referred to above is hydrolyzed in the presence of an HCl solution to produce dimethyl thioxane, the oil-like hydrolytic condensation product, hydrochloric acid, and in some cases the corresponding glycol of dichlorodipropyl sulfide, dihydroxydipropyl sulfide.

If hydrolysis is conducted in the presence of water, only, considerable amounts of the said glycol and HCl are formed until stability is attained. The reaction is reversible so that the formation of the glycol can be reduced to a minimum by hydrolyzing in the presence of a dilute HCl solution.

The initial concentration of the HCl solution may be varied considerably, but it has been found that formation of the glycol is reduced to a minimum when a 21% HCl solution is used, The hydrolysis reaction is carried out at relatively high temperature, preferably at about 100° C. and is continued for a period of about one to five hours. The reaction can be expedited by increasing the temperature to above 100° C. or retarded by decreasing the temperature to below 100° C. A range of from about 45° C. to 150° C. is most practical from the economic standpoint, a lower temperature than 45° C. unduly prolonging the reaction and a higher temperature than 200° C. producing no appreciable saving in the time of the reaction. Too high a temperature also induces side reactions.

The hydrolysis produces an aqueous phase containing the corresponding glycol and hydrogen chloride and a lower layer containing chiefly the dimethyl thioxane and the hydrolytic condensation product. The aqueous phase may be concentrated to convert the glycol to the corresponding dichloro compound for recycle to the hydrolysis reaction. The lower layer can be steam distilled or otherwise processed to separate the dimethyl thioxane (B. P. 162° C.) and the remainder of the lower layer constitutes the hydrolytic condensation product. The exact composition of the latter will depend somewhat on whether the initial propylene sulfur monochloride reaction product is purified and the exact method used. For example, if the purification is such as to separate only dichlorodipropyl sulfide, the hydrolytic condensation product will contain a minimum of the disulfide condensate and the condensate from isomers and small amounts of other products that may be formed in the reaction.

Three reactions are thought to take place. One is as follows:

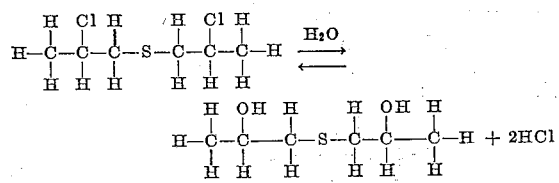

It will be noticed that this reaction is reversible and for this reason the glycol form can be reconverted to the corresponding dichloro compound. In a continuous process the amount of glycol will reach an equilibrium in the process so that no glycol will be formed as a final reaction product.

The second reaction is as follows:

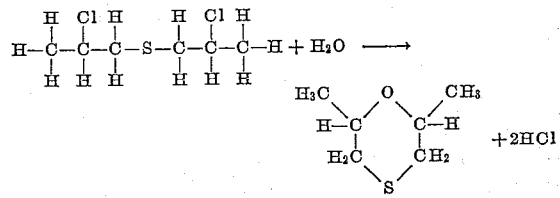

The exact formula of the hydrolytic condensation product of dichlorodipropyl sulfide produced in the third reaction is not known, nor have the terminal groups been identified, but it is thought likely that it may be:

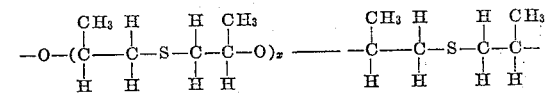

It is also likely when dichlorodipropyl disulfide is present, as in the crude reaction product of sulfur monochloride and propylene, that the hydrolytic condensation product of the disulfide may be formed.

It will be seen that hydrochloric acid is also produced which can be recovered.

A typical example of the process will be given as illustrative.

Sulfur monochloride is introduced into a pressure reaction zone which withstands a gauge pressure of about 100 pounds/sq. inch or higher. The reaction zone is cooled, whereby the temperature of the reactants may be maintained at not over about 35° C. The reaction in the reaction zone may be a batch operation or, if desired, two or more of such pressure reaction zones may be provided to supply the remainder of the system continuously, or the products may be fed continuously through a reaction zone.

Propylene gas is introduced at a pressure of about 30 pounds/sq. inch gauge pressure and is bubbled through the sulfur monochloride. A pressure of about 30 pounds/sq. inch is maintained during the reaction.

At intervals of about 15 minutes, samples are withdrawn and tested with a starch-iodide solution until the sample fails to turn blue. At this time, all of the sulfur monochloride has been converted into dichlorodipropyl sulfide and the other reaction products mentioned.

The supply of propylene gas is shut off and the pressure of the reaction is reduced at atmospheric pressure.

In this example the reaction mixture is purified by distillation although as explained above, the crude reaction mixture may be used. In this purification the crude reaction product is steam distilled to distill off dichlorodipropyl sulfide and other components having similar boiling points. The steam distillation is conducted in the presence of a 21% hydrochloric acid solution to prevent the formation of any substantial quantity of the corresponding glycol, namely dihydroxydipropyl sulfide.

The dichlorodipropyl sulfide vapors and other components having similar boiling points are condensed. The condensate is settled and an aqueous hydrochloric acid phase and the dichlorodipropyl sulfide separate into layers, the hydrochloric acid solution being in the top layer. The condensed hydrochloric acid may be returned for re-use in the distillation of additional reaction products, and in this way the hydrochloric acid re-used to minimize formation of the glycol. The higher boiling or nonvolatile components, including sulfur, which constitute about 15% of the reaction products, are drawn off the bottom of the still, where the hydrochloric acid in the bottoms may be separated and returned to the distillation, while the settlings or waste bottoms are drawn off and discarded.

It will be understood that the distillation is a method of purifying the dichlorodipropyl sulfide, and in the event that the crude reaction mass is to be hydrolyzed instead of the purified product, it may be treated in the following hydrolysis step. If sulfur is not separated by a preliminary distillation, it is separated after hydrolysis as it is insoluble in the hydrolysis products. The condensate, primarily dichlorodipropyl sulfide (or the crude reaction mixture of this is to be used) is delivered continuously to a reaction zone which is provided for agitation and heating. The dichlorodipropyl sulfide is then mixed with a 21% hydrochloric acid solution in the proportions of about one part by volume of dichlorodipropyl sulfide to 2 to 3 parts by volume of 21% hydrochloric acid. The proportion is not critical. The mixture is agitated and heated to about 100° C. while it flows through the reaction zone. A 21% hydrochloric acid solution is constantly boiling at atmospheric pressure, but this may vary with the pressure used. The reaction zone is of such size and the rate of flow of the reactants is such that the reactants remain in the chamber for a period of about two hours before being discharged to a settling tank where any remaining dichlorodipropyl sulfide, dimethyl thioxane and hydrolytic condensation product are separated by decantation from the aqueous hydrochloric acid solution and any dihydroxydipropyl sulfide formed during the reaction. The mixture of hydrochloric acid and dihydroxydipropyl sulfide are subjected to steam distillation where dilute aqueous hydrochloric acid and any dichlorodipropyl sulfide produced by the reversible reaction between the acid and dihydroxydipropyl sulfide are returned to the reaction zone and mixed with water in a proper proportion to produce the desired 21% hydrochloric acid solution. Any residue or bottoms from the distillation are settled and any dichlorodipropyl sulfide may be returned to the reaction zone and any remaining hydrochloric acid and dihydroxydipropyl sulfide are separated and recycled.

The heavier water-insoluble dimethyl thioxane and the hydrolytic condensation product, together with some dichlorodipropyl sulfide, are drawn off from the bottom after settling and steam distilled in the presence of 21% hydrochloric acid. The dichlorodipropyl sulfide, dimethyl thioxane and some 21% hydrochloric acid solution vaporize and are condensed to liquid after which they separate into an upper layer of 21% hydrochloric acid and a lower layer of dichlorodipropyl sulfide and dimethyl thioxane. The hydrochloric acid may be returned to the distillation while the dichlorodipropyl sulfide and dimethyl thioxane can be distilled so that the dimethyl thioxane is vaporized and recovered. The dichlorodipropyl sulfide is returned to the reaction zone for further treatment.

The unvaporized portion, consisting of the steam-refined hydrolytic condensation product, is drawn off.

The final yield of hydrolytic condensation product is about 60 pounds per hundred pounds of dichlorodipropyl sulfide. About 5 pounds of dimethyl thioxane is obtained from each 100 pound charge of dichlorodipropyl sulfide.

While the process has been described with reference to a continuous process, it will be understood that it can also be practiced as a batch operation.

From the preceding description it will be apparent that a process has been provided whereby dimethyl thioxane may be produced efficiently and economically and that the process also results in a novel hydrolytic condensation product which is very useful as a plasticizer and as a special lubricant.

It will be understood from the preceding description that the process is susceptible to considerable variation and that the example given above should be considered as illustrative and not as limiting the scope of the following claims.

We claim:

1. A method for preparing dimethyl thioxane and an oxygen-containing hydrolytic condensation product which comprises reacting propylene and sulfur monochloride at a temperature at which the reaction proceeds and below that at which the dichlorodipropyl sulfide would be decomposed not exceeding 50° C. to produce dichlorodipropyl sulfide and then mixing and heating the dichlorodipropyl sulfide in the liquid phase with aqueous hydrochloric acid in the liquid phase to effect a liquid phase hydrolysis of the dichlorodipropyl sulfide and form a liquid phase comprising dimethyl thioxane and the hydrolytic condensation product in contact with the aqueous hydrogen chloride.

2. A method in accordance with claim 1 in which the reaction temperature does not exceed 35° C.

3. A method in accordance with claim 1 in which the amount of hydrochloric acid solution is sufficient to minimize formation of dihydroxy dipropylene sulfide in the course of the liquid phase hydrolysis.

4. A method in accordance with claim 1 in which the aqueous hydrochloric acid is a 21% hydrochloric acid solution.

5. A method in accordance with claim 1 which includes distilling the dimethyl thioxane from the hydrolysis reaction mixture to separate it from the hydrolytic condensation product.

6. An oil- and water-insoluble oil-like oxygen-containing hydrolytic condensation product having a viscosity within the range from about 200 to about 400 SSU at 100° F. and a low viscosity index, obtained by the process of claim 1.

7. A method for hydrolyzing dichlorodipropyl sulfide to dimethyl thioxane and an oxygen-containing hydrolytic condensation product which comprises mixing and heating the dichlorodipropyl sulfide in the liquid phase with aqueous hydrochloric acid in the liquid phase to effect a liquid phase hydrolysis of the dichlorodipropyl sulfide and form a liquid phase comprising dimethyl thioxane and the hydrolytic condensation product in contact with the aqueous hydrogen chloride.

8. A method in accordance with claim 7 in which the aqueous hydrochloric acid is a 21% hydrochloric acid solution.

9. A continuous process for hydrolyzing dichlorodipropyl sulfide which comprises reacting the dichlorodipropyl sulfide with water in the presence of an aqueous solution of hydrochloric acid, stratifying the reaction products to form two layers, the top layer containing dihydroxydipropyl sulfide and hydrochloric acid, and the bottom layer containing unhydrolyzed dichlorodipropyl sulfide, dimethyl thioxane and a hydrolytic condensation product; distilling the second layer in the presence of aqueous hydrochloric acid to obtain the hydrolytic condensation product and the dimethyl thioxane as separate products, and recycling dihydroxydipropyl sulfide and unhydrolyzed dichlorodipropyl sulfide together with aqueous hydrochloric acid to the hydrolysis reaction zone to prevent the formation of dihydroxydipropyl sulfide.

10. A continuous process for hydrolyzing dichlorodipropyl sulfide which comprises reacting the dichlorodipropyl sulfide with water in the presence of an aqueous solution of hydrochloric acid, stratifying the reaction products to form two layers, the top layer containing dihydroxydipropyl sulfide and hydrochloric acid, and the bottom layer containing unhydrolyzed dichlorodipropyl sulfide, dimethyl thioxane and a hydrolytic condensation product; recycling the dihydroxydipropyl sulfide to the hydrolysis reaction zone, distilling the second layer in the presence of aqueous hydrochloric acid to obtain the hydrolytic condensation product and the dimethyl thioxane as separate products, and recycling the dihydroxydipropyl sulfide formed during distillation and unhydrolyzed dichlorodipropyl sulfide together with aqueous hydrochloric acid to the hydrolysis reaction zone, whereby the formation of dihydroxydipropyl sulfide is minimized.

11. A method which comprises heating dichlorodipropyl sulfide in an aqueous solution to form dimethyl thioxane and a hydrolytic condensation product as the primary products, stratifying the reaction products to form two layers, the bottom layer comprising the dimethyl thioxane, the hydrolytic condensation product and unhydrolyzed dichlorodipropyl sulfide and the top layer comprising dihydroxydipropyl sulfide and hydrochloric acid, and distilling the bottom layer in the presence of aqueous hydrochloric acid to obtain the hydrolytic condensation product and the dimethyl thioxane as separate products.

EVERETT C. HUGHES.
FRANKLIN VEATCH.

References Cited in the file of this patent

UNITED STATES PATENTS

| Number | Name | Date |
|---|---|---|
| 2,411,275 | Kinneberg et al. | Nov. 19, 1946 |
| 2,508,005 | Ballard | May 16, 1950 |

OTHER REFERENCES

Coffey: J. Chem. Soc., London, 119, 94–8 (1921).

"The Formation of High Polymers" by Patrick. Transactions of the Faraday Society, vol. 32, January 1936, pp. 347–358.